US012761611B2

(12) United States Patent
Kwak et al.

(10) Patent No.: US 12,761,611 B2
(45) Date of Patent: Oct. 13, 2026

(54) METHOD FOR GENERATING ARTIFICIAL INTELLIGENCE MODEL FOR PROCESS CONTROL, PROCESS CONTROL SYSTEM BASED ON ARTIFICIAL INTELLIGENCE MODEL, AND REACTOR COMPRISING SAME

(71) Applicant: SABIC SK NEXLENE COMPANY PTE. LTD., Singapore (SG)

(72) Inventors: Dong Hun Kwak, Daejeon (KR); Byeong Eon Park, Daejeon (KR); Dae Ho Shin, Daejeon (KR); Choon Sik Shim, Sejong (KR); Dong Kyu Park, Daejeon (KR)

(73) Assignee: SABIC SK NEXLENE COMPANY PTE. LTD., Singapore (SG)

( * ) Notice: Subject to any disclaimer, the term of this patent is extended or adjusted under 35 U.S.C. 154(b) by 371 days.

(21) Appl. No.: 18/572,682

(22) PCT Filed: Dec. 6, 2022

(86) PCT No.: PCT/IB2022/061797

§ 371 (c)(1),
(2) Date: Dec. 20, 2023

(87) PCT Pub. No.: WO2023/105392

PCT Pub. Date: Jun. 15, 2023

(65) Prior Publication Data

US 2024/0295860 A1 Sep. 5, 2024

(30) Foreign Application Priority Data

Dec. 7, 2021 (KR) ........................ 10-2021-0173790

(51) Int. Cl.
*G05B 13/02* (2006.01)

(52) U.S. Cl.
CPC .................................. *G05B 13/027* (2013.01)

(58) Field of Classification Search
CPC ...... G05B 13/027; G05B 13/04; G05B 17/02; B01J 19/00; B01J 19/0006; G06N 20/00; G16C 20/10; G16C 20/80
See application file for complete search history.

(56) References Cited

U.S. PATENT DOCUMENTS 10,990,067 B2 * 4/2021 Modi .................. G05B 13/048
11,199,837 B2 12/2021 Cella et al.
(Continued)

FOREIGN PATENT DOCUMENTS

CN 105629738 B 6/2018
CN 109338456 A 2/2019
(Continued)

OTHER PUBLICATIONS

St. John, J. et al., "Real-time artificial intelligence for accelerator control: A study at the Fermilab Booster," Physical Review Accelerators and Beams, vol. 24, No. 104601, Oct. 18, 2021, 17 pages.
(Continued)

*Primary Examiner* — Christopher E. Everett
(74) *Attorney, Agent, or Firm* — McCoy Russell LLP

(57) ABSTRACT

The present invention relates to a method for generating an artificial intelligence model for process control, a process control system based on the artificial intelligence model, and a reactor comprising same, the present invention may easily derive an optimal reactor input condition for achieving the target operation condition of the reactor and the target physical property value of the product by using the AI model.

8 Claims, 2 Drawing Sheets

(56) References Cited

U.S. PATENT DOCUMENTS

| | | | | |
|---|---|---|---|---|
| 11,520,310 | B2 * | 12/2022 | Zubarev | G05B 19/4155 |
| 11,568,310 | B2 | 1/2023 | Ko et al. | |
| 11,630,446 | B2 * | 4/2023 | Andreu | G06N 20/00 700/108 |
| 11,675,334 | B2 * | 6/2023 | Zubarev | B01J 19/0006 700/268 |
| 11,754,998 | B2 * | 9/2023 | Zhao | G05B 11/36 700/29 |
| 11,782,401 | B2 * | 10/2023 | Keenan | G05B 13/048 706/23 |
| 11,853,032 | B2 | 12/2023 | Chan et al. | |
| 12,306,599 | B2 * | 5/2025 | Takenaka | G05B 13/048 |
| 2008/0082194 | A1 | 4/2008 | Samardzija et al. | |
| 2019/0188584 | A1 | 6/2019 | Rao et al. | |
| 2019/0198136 | A1 | 6/2019 | Hou et al. | |
| 2020/0379442 | A1 * | 12/2020 | Chan | B01J 19/0033 |
| 2022/0143569 | A1 * | 5/2022 | Holzmeister | B01J 19/0033 |
| 2023/0028276 | A1 * | 1/2023 | Yakut | G06N 3/084 |

FOREIGN PATENT DOCUMENTS

| | | | |
|---|---|---|---|
| CN | 110073301 | A | 7/2019 |
| EP | 3696619 | A1 | 8/2020 |
| JP | 2020530159 | A | 10/2020 |
| KR | 20190096311 | A | 8/2019 |
| KR | 102147609 | B1 | 8/2020 |
| KR | 20210027668 | A | 3/2021 |
| KR | 102283207 | B1 | 7/2021 |
| KR | 20210121861 | A | 10/2021 |
| TW | 201512464 | A | 4/2015 |
| WO | 2021105246 | A1 | 6/2021 |

OTHER PUBLICATIONS

European Patent Office, Extended European Search Report Issued in Application No. 22903692.6, Sep. 8, 2025, Germany, 9 pages.

ISA Korean Intellectual Property Office, International Search Report Issued in Application No. PCT/IB2022/061797, Mar. 10, 2023, WIPO, 10 pages.

* cited by examiner

METHOD FOR GENERATING ARTIFICIAL INTELLIGENCE MODEL FOR PROCESS CONTROL, PROCESS CONTROL SYSTEM BASED ON ARTIFICIAL INTELLIGENCE MODEL, AND REACTOR COMPRISING SAME

CROSS REFERENCE TO RELATED APPLICATIONS

The present application is a U.S. National Phase of International Application No. PCT/IB2022/061797 entitled "METHOD FOR GENERATING ARTIFICIAL INTELLIGENCE MODEL FOR PROCESS CONTROL, PROCESS CONTROL SYSTEM BASED ON ARTIFICIAL INTELLIGENCE MODEL, AND REACTOR COMPRISING SAME," and filed on Dec. 6, 2022. International Application No. PCT/IB2022/061797 claims priority to Republic of Korea Patent Application No. 10-2021-0173790 filed on Dec. 7, 2021. The entire contents of each of the above-listed applications are hereby incorporated by reference for all purposes.

TECHNICAL FIELD

The present invention relates to a method for generating an artificial intelligence (AI) model for process control, a process control system based on an AI model, and a reactor including the same.

BACKGROUND AND SUMMARY

In chemical processes, various types of materials react with each other and the reactivity appears to be different depending on conditions, such as temperature, pressure, and composition. In addition, since various types of products are produced in a single factory, it may be difficult to understand all the chemical processes for the products and it may be impossible to perform measurement or it may take a long time to identify measurement results.

Due to this, control of a chemical process is difficult, defective products (off-spec) occur, and energy is wasted. In addition, when a user arbitrarily changes input conditions to correct a defective product production conditions to on-spec production conditions, there is a high possibility of trial and error.

DISCLOSURE

Technical Problem

An object of the present invention is to provide a method for generating an artificial intelligence (AI) model for process control, an AI model-based process control system, and a reactor including the same to reduce the rate of defective products occurring during product manufacturing by the reactor and to increase the rate of on-spec products.

Technical Solution

In one general aspect, an artificial intelligence (AI) model-based process control system includes an AI control model unit 100 including a data storage unit 110 storing a plurality of pieces of preset reactor process data, a data correction unit 120 generating training data by removing outliers from the stored reactor process data, and a data derivation unit 130 trained with the generated training data so as to derive an optimal reactor input condition for satisfying a reactor operation condition and the physical property value of a product resulting from the reactor; an input unit 200 obtaining data including a reactor target operation condition and a target physical property value of the product resulting from the reactor and providing the obtained data to the AI control model unit 100; and an output unit 300 receiving the optimal reactor input condition for satisfying the reactor target operation condition and the target physical property value of the product from the AI control model unit 100 and controlling input of the reactor under the optimal reactor input condition, wherein the reactor input condition includes (a) below:

(a): one or more of a composition, temperature, flow rate, and pressure of a raw material introduced into the reactor or combinations thereof.

In addition, according to an exemplary embodiment of the present invention, the reactor input condition may further include (b) below:

(b) a composition, temperature, flow rate, and pressure of a catalyst introduced into the reactor or combinations thereof.

In addition, according to an exemplary embodiment of the present invention, the plurality of pieces of preset reactor process data may include an actual input condition of the reactor, an actual operation condition of the reactor, and an actual physical property value of the product by the reactor.

In addition, according to an exemplary embodiment of the present invention, the data derivation unit 130 may derive a predicted operation condition of the reactor and a predicted physical property value of the product by the reactor based on the input conditions of the reactor provided from the input unit 200, and the artificial intelligence control model unit 100 may further include: a data analysis unit 140 comparing the predicted operation condition of the reactor and the predicted physical property value of the product derived by the data derivation unit 130 with the actual operation condition of the reactor and the actual physical property value of the product in the data storage unit 110 or the data correction unit 120; and a data re-training unit 150 re-training the data derivation unit 130 when a comparison result provided from the data analysis unit 140 satisfies condition (1) or condition (2) below:

(1) when an error rate between the actual operation conditions of the reactor and the predicted operation conditions of the reactor exceeds a preset tolerance, (2) when the error rate between the actual physical property value of the product and the predicted physical property value of the product exceeds a preset tolerance.

In addition, according to an exemplary embodiment of the present invention, when the target physical property value provided from the input unit 200 is changed during an operation of the reactor, the data derivation unit 130 may derive a new optimal input condition of the reactor by analyzing dynamic characteristics of the reactor input condition for reaching a changed target physical property value from a time point at which the target physical property value is changed.

In addition, according to an exemplary embodiment of the present invention, the AI control model unit 100 may be trained by one or more of linear regression, logistic regression, a decision tree, a random forest, a support vector machine, gradient boosting, a convolution neural network, a recurrent neural network, long-short term memory, an attention model, a transformer, a generative adversarial network, reinforcement learning, or combinations (ensemble) thereof.

In another general aspect, a reactor includes the artificial intelligence (AI)-based process control system described above.

In addition, according to an exemplary embodiment of the present invention, the reactor may be one of a tubular reactor, a tower reactor, a stirred tank reactor, a fluidized-bed type reactor, and a loop reactor.

In addition, according to an exemplary embodiment of the present invention, the reactor may be provided in plurality, and the plurality of reactors may be one of a tubular reactor, a tower reactor, a stirred tank reactor, a fluidized-bed type reactor, and a loop reactor, independently.

In another general aspect, a method for generating an artificial intelligence (AI) model for process control includes: storing a plurality of pieces of reactor process data including an actual input condition of a reactor, an actual operation condition of the reactor, and an actual physical property value of a product by the reactor or a computation result based on a simulation; generating training data by removing outliers from the stored reactor process data; and generating an AI model using an AI algorithm that learns the generated training data to derive an optimal reactor input condition to satisfy an operation condition of the reactor and a physical property value of a product by the reactor, wherein the reactor input condition includes (a) below:

(a) one or more of a composition, flow rate, and pressure of a raw material introduced into the reactor, or combinations thereof.

In addition, according to an exemplary embodiment of the present invention, the he reactor input condition may further include (b) below:

(b) one or more of a composition, temperature, flow rate, and pressure of a catalyst introduced into the reactor or combinations thereof.

In addition, according to an exemplary embodiment of the present invention, in the artificial intelligence algorithm, when the physical property value of the product is changed during an operation of the reactor, dynamic characteristics of the reactor input condition to reach a changed physical property value from a time point at which the physical property value is changed may be analyzed to derive a new optimal reactor input condition.

In addition, according to an exemplary embodiment of the present invention, in the generating of the AI model, the AI model may be generated by one or more of linear regression, logistic regression, a decision tree, a random forest, a support vector machine, gradient boosting, a convolution neural network, a recurrent neural network, long-short term memory, an attention model, a transformer, a generative adversarial network, reinforcement learning, or combinations (ensemble) thereof.

Advantageous Effects

According to an exemplary embodiment of the present invention, the present invention may easily derive an optimal reactor input condition for achieving the target operation condition of the reactor and the target physical property value of the product by using the AI model.

According to an exemplary embodiment of the present invention, since the input of the reactor may be controlled with the optimal reactor input condition, unit costs and time required for production of products may be reduced.

According to an exemplary embodiment of the present invention, by controlling the process using an AI model, the intervention of an external user (a manager, etc.) may be minimized, thereby reducing trial and error and obtaining a highly reliable reactor product.

BRIEF DESCRIPTIONS OF THE DRAWINGS

DETAILED DESCRIPTION

Best Mode

Figure 1:
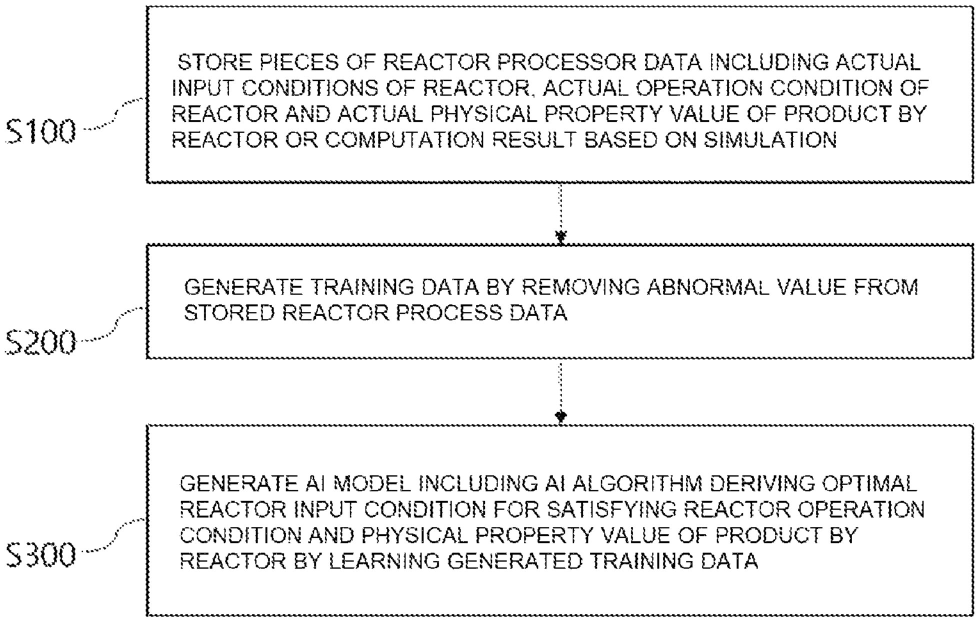
FIG. 1 is a flowchart of a method for generating an artificial intelligence (AI) model for process control according to an exemplary embodiment of the present invention.

The terminology used herein is for the purpose of describing particular exemplary embodiments only. Thus, unless a context clearly dictates otherwise, expressions used in the singular include expressions in the plural. Furthermore, it will be understood that terms, such as "comprising" or "having" are intended to indicate the presence of the features, steps, functions, components, or combinations thereof disclosed in the specification, and are not intended to preclude the possibility that one or more additional features, steps, functions, components, or combinations thereof may be present or added.

Meanwhile, unless otherwise defined, all terms used herein have the same meaning as commonly understood by one of ordinary skill in the art to which this disclosure belongs. Accordingly, these terms should not be interpreted in an idealized or overly formal sense unless expressly so defined herein.

Further, the terms "about", "substantially", and the like as used throughout the specification mean that when natural manufacturing and material permissible errors are set forth, such permissible errors correspond to or are similar to a value, and such values are intended for the purpose of clearly understanding the present invention or preventing illegal use of the present invention by unintended infringers.

In addition, a "system" means a set of components including apparatuses, mechanisms, units, etc. which are organized and regularly interact with each other to perform required functions.

Also, in this specification, "part" is a term used to refer to a component that performs one or more functions or operations, and such a component may be implemented as hardware or software, or a combination of hardware and software.

Also, in this specification, the term "preset" means previously set by an external user (such as an administrator).

Hereinafter, an artificial intelligence (AI) model-based process control system according to an exemplary embodiment of the present invention will be described in detail with reference to the accompanying drawings. The exemplary embodiments of the present invention to be introduced below are provided by way of example so that the idea of the present invention may be sufficiently transferred to those skilled in the art to which the present invention pertains. Accordingly, the scope of the present invention is not restricted to the following description and accompanying drawings and may be embodied in another form. In addition, throughout the specification, like reference numerals denote like components.

FIG. 1 is a flowchart of a method for generating an AI model for process control according to an exemplary embodiment of the present invention. Hereinafter, a method for generating an AI model for process control will be described in detail with reference to FIG. 1.

A method for generating an AI model for process control according to an exemplary embodiment of the present invention may include storing a plurality of pieces of reactor process data including an actual input condition of a reactor, an actual operation condition of the reactor, and an actual physical property value of a product by the reactor or a computation result based on a simulation in operation S100, generating training data by removing outliers from the stored reactor process data in operation S200, and generating an AI model including an AI algorithm that learns the generated training data to derive an optimal reactor input condition to satisfy an operation condition of the reactor and a physical property value of a product by the reactor in operation S300.

The reactor input condition includes (a) below:

(a) one or more of a composition, temperature, flow rate, and pressure of a raw material introduced into the reactor, or combinations thereof.

When a catalyst is input to the reactor, an adjusted reactor input condition adjusted may further include (b) below:

(b) one or more of a composition, temperature, flow rate, and pressure of a catalyst introduced into the reactor or combinations thereof.

In the reactor input condition (a), the composition of the raw material may include a type and content of the compounds constituting the raw material, and the content may be an absolute value, such as weight or volume, or a relative value, such as weight ratio or volume ratio. A temperature of the raw material may refer to a temperature of the raw material when the raw material is introduced into the reactor, a flow rate of the raw material may refer to a flow rate of the raw material out of the entire input into the reactor, and a pressure of the raw material may refer to pressure of the raw material out of the entire input into the reactor.

From the viewpoint of more precisely controlling the reactor, the reactor input condition (a) may be, for example, a composition and temperature of the raw material, or a composition and flow rate of the raw material, or a composition and pressure of the raw material, or a temperature and flow rate of the raw material, a temperature and pressure of the raw material, or a flow rate and pressure of the raw material, for example, a composition, temperature, and flow rate of the raw material, or a composition, temperature, and pressure of the raw material, or a temperature, flow rate, and pressure of the raw material, for example, a composition, temperature, flow rate, and pressure of the raw material.

In the reactor input condition (b), a composition of the catalyst may include a type and content of a compound constituting the catalyst, and in this case, the content may be an absolute value, such as weight or volume, or a relative value, such as weight ratio or volume ratio. A temperature of the catalyst may refer to a temperature of the catalyst when the catalyst is introduced into the reactor, a flow rate of the catalyst may refer to a flow rate of the catalyst in a total input into the reactor, and a pressure of the catalyst may refer to pressure of the catalyst in the total input into the reactor.

From the viewpoint of operating the reactor more precisely, the reactor input condition (b) may be, for example, a composition and temperature of the catalyst, or a composition and flow rate of the catalyst, or a composition and pressure of the catalyst, or a temperature and flow rate of the catalyst, a temperature and pressure of the catalyst, or a flow rate and pressure of the catalyst, for example, a composition, temperature, and flow rate of the catalyst, or a composition, temperature, and pressure of the catalyst, or a temperature, flow rate, and pressure of the catalyst, for example, a composition, temperature, flow rate, and pressure of the catalyst.

Reactor input conditions to be mentioned below are the same as those described above, so descriptions thereof are omitted for convenience.

The AI model generated in the operation (S300) of generating the AI model may include an AI algorithm A1 that derives an optimal reactor input condition for satisfying a reactor operation condition and a physical property value of a product by the reactor, and a configuration thereof is not particularly limited. For example, the AI model may include an algorithm that predicts various results of a reactor process.

The AI model according to an exemplary embodiment may include an AI algorithm A2 that derives a predicted operation condition of the reactor or a predicted physical property value of the product by the reactor based on the input condition of the reactor.

According to an exemplary embodiment of the present invention, the predicted operation condition of the reactor derived by the AI algorithm A2 or the predicted physical property value of the product by the reactor may be provided to the AI algorithm A1 to drive an optimal reactor input condition based on the predicted operation condition of the reactor or the predicted physical property value of the reactor.

According to an exemplary embodiment of the present invention, in the AI algorithm A1, when the physical property value of the product is changed during an operation of the reactor, dynamic characteristics of the reactor input conditions to reach the changed physical property value from a time point at which the physical property value is changed may be analyzed to derive a new optimal reactor input condition.

Analysis of dynamic characteristics may be performed to predict physical and chemical changes in the process, including the reactor that may appear in the process in which the physical property value changes the time-series and an optimal reactor input condition for each process in the process of reaching the changed physical property value may be derived. A criterion for dividing a unit of the process in each process may be set in advance by an external user (administrator, etc.). For example, the criterion may be divided based on time or for example, the criterion may be divided based on a total amount of the produced product. However, it should be noted that the examples described above are merely examples to help understanding, and that the criteria are not limited to the examples described above. Based on optimal reactor input condition for each reaction process described above, it may more quickly and stably reach a physical property value after the change from a state at a time point of the change.

The operation (S300) of generating the AI model may include one or more of linear regression, logistic regression, a decision tree, a random forest, a support vector machine, gradient boosting, a convolution neural network, a recurrent neural network, long-short term memory, an attention model, a transformer, a generative adversarial network, reinforcement learning, or combinations (ensemble) thereof.

Figure 2:
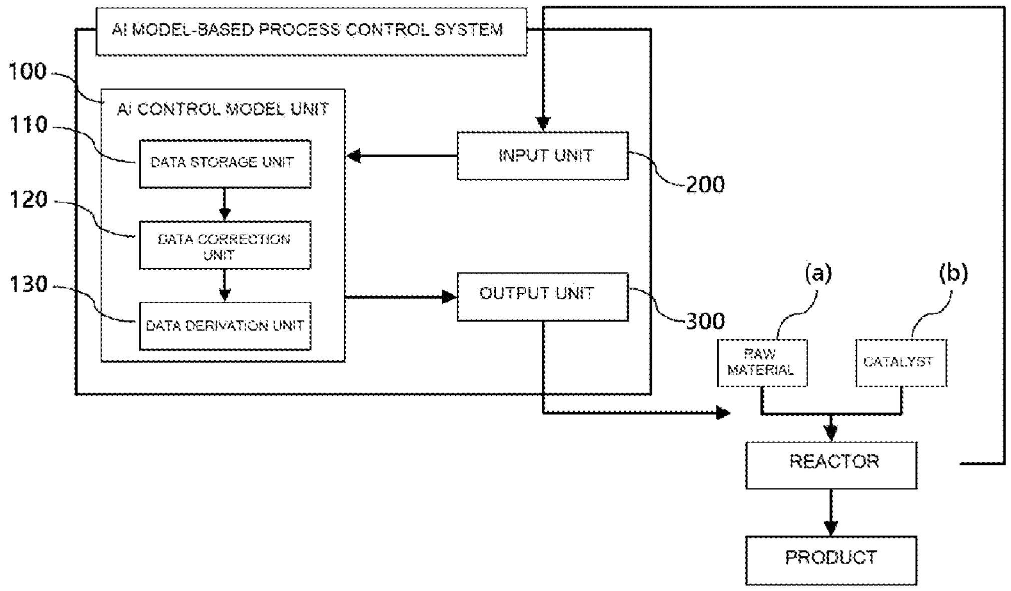
FIG. 2 is a configuration diagram showing an AI model process control system according to an exemplary embodiment of the present invention.

FIG. 2 is a configuration diagram showing an AI model-based process control system.

As shown in FIG. 2, the AI model-based process control system according to an exemplary embodiment of the present invention may include an AI control model unit 100, an input unit 200, and an output unit 300, and may control input of the reactor under the input condition of the reactor obtained through the AI control model unit 100, the input unit 200, and the output unit 300.

Hereinafter, each component of the AI model-based process control system according to an exemplary embodiment of the present invention will be described in detail.

The AI control model unit 100 may include a data storage unit 110, a data correction unit 120, and a data derivation unit 130.

The data storage unit 110 may store a plurality of pieces of preset reactor process data. The plurality of pieces of preset reactor process data is a plurality of pieces of experimental data including an actual input condition of the reactor, an actual operation condition of the reactor, and an actual physical property value of a product based on the reactor collected from laboratories, pilot plants, commercial plants, etc.; or a computation result by simulation, and corresponds to row data for training an AI model. The operation condition of the reactor may refer to, for example, temperature and pressure in the reactor, but is not limited thereto. The computation result by simulation is a result obtained by performing a simulation of the reactor process, and the computation result may include all data of the process. The computation result may include, for example, an input condition of the reactor, an operation condition of the reactor, and a physical property value of a product based on the reactor derived by a simulation, for example.

The data correction unit 120 may generate training data by removing outlier dates of the stored experimental data. Training data is used as data for training an AI model. According to another exemplary embodiment, the data correction unit 120 may generate training data by standardizing a scale after removing the outliers.

The data derivation unit 130 may learn from the generated training data and derive an optimal input condition for the reactor to satisfy the reactor operation condition and the physical property value of the product by the reactor. The configuration of the data derivation unit 130 may be one or more of a physical property prediction AI model, a control optimization AI model, and other AI models, combinations thereof, or an AI model obtained by integrating the AI models mentioned above. Here, the derived optimal input condition for the reactor may be provided to the output unit 300 through the data derivation unit 130 or a separate data providing unit.

An optimal input condition for the reactor may be derived after an external user (a manager, etc.) sets a purpose to be obtained through an AI model-based process control system in advance. The purpose to be obtained through the AI model-based process control system may be one or more of, for example, a reduction of input raw materials, a reduction of input catalyst, a reduction of grade change time, a reduction of off-spec, an increase of product yield, an increase in product yield, a reduction in utility usage, a reduction in operating costs, a reduction in production costs, or combinations thereof, but is not limited thereto.

According to an example, the data derivation unit 130 may derive a predicted operation condition of the reactor or a predicted physical property value of a product produced by the reactor based on the data provided from the input unit 200, as well as the optimal input condition for the reactor. According to an example, the derived predicted operation condition or predicted physical property value may be displayed through a commonly used display device, such as a monitor, so that an external user (a manager, etc.) may check the same in real time.

The AI control model unit 100 may receive data including a target operation condition of the reactor and a target physical property value of the product produced by the reactor from the input unit 200. According to an example, the data may be all process data of the reactor to be controlled, including the input condition of the reactor, the operation condition of the reactor, the physical property value of the product, and the like. The target operation condition of the reactor and the target physical property value of the product by the reactor may be set in advance by an external user (a manager, etc.).

The AI control model unit 100 may derive the optimal reactor input condition to satisfy the target operation condition of the reactor and the target physical property value of the product by the reactor provided through the data derivation unit 130, and the optimal input condition derived of the reactor here may be provided to the output unit 300 through the data derivation unit 130 or a separate data providing unit.

According to an example, when the target physical property value provided from the input unit 200 is changed during an operation of the reactor, the data derivation unit 130 may analyze dynamic characteristics of the input condition of the reactor to reach a changed target physical property value from a time point at which the target physical property value is changed to derive a new optimal input condition of the reactor.

The analysis of dynamic characteristics may be performed to predict a physical and chemical change in the reactor that may occur in the process in which the physical property value changes time-sequentially, as well as the reactor input condition (a) or (b) to reach the target physical property value, through which the target physical property value may be reached from the state at the time of change more quickly and stably.

Figure 3:
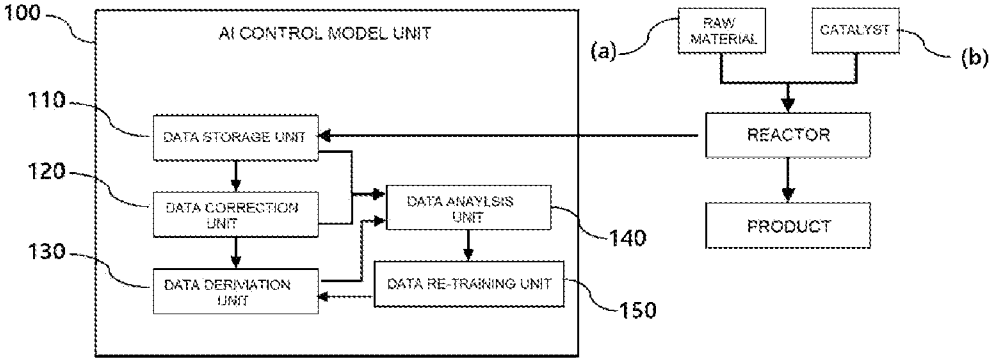
FIG. 3 is a re-learning configuration diagram of an AI control model unit 100 according to an exemplary embodiment of the present invention.

FIG. 3 is a re-learning configuration diagram of the AI control model unit 100 according to an exemplary embodiment of the present invention.

According to an exemplary embodiment of the present invention, the AI control model unit 100 may further include a data analysis unit 140 and a data re-training unit 150 to relearn the AI model.

According to an example, the data derivation unit 130 may derive a predicted operation condition of the reactor and a predicted physical property value of the product by the reactor based on the input condition of the reactor provided from the input unit 200. The derived predicted operation condition of the reactor and the predicted physical property value of the product may be provided to the data analysis unit 140 through the data derivation unit 130 or a separate data providing unit.

According to an example, the data analysis unit 140 compares the predicted operation condition of the reactor and the predicted physical property value of the product ② derived from the data derivation unit 130 with the actual operation condition of the reactor and the actual physical property value ① of the product provided from the data storage unit 110 or the data correction unit 120. A comparison result may be provided to the data re-training unit 150 through the data analysis unit 140 or a separate data providing unit.

The actual operation condition of the reactor and the actual physical property value ① of the product may be provided from the data storage unit 110 or the data correction unit 120, and here, the actual operation condition of the reactor and the actual physical property value of the product provided from the data correction unit 120 may be prepared by removing the outliers of the process data of the reactor stored in the data storage unit 110.

According to an example, when the comparison result provided to the data analysis unit 140 satisfies the following condition (1) or condition (2), the data re-training unit 150 may re-train the data derivation unit 130:

(1) when an error rate between the actual operation condition of the reactor and a certain operation condition of the reactor exceeds tolerance, (2) when an error rate between the actual physical property value of the product and a certain physical property value of the product by the reactor exceeds tolerance Here, the tolerance of the error rate may be set in advance by an external user (a manager, etc.) in consideration of the type of process, the type of reactant, the type of controller, and the like. The tolerance of the error rate may be, for example, 30% or less, or 20% or less, or 15% or less, or 10% or less, or 5% or less.

According to the present invention, the accuracy of the AI control model unit 100 may further increase through the relearning process described above. As a result, the reliability of the optimal input condition of the reactor that satisfies the reactor operation condition and the physical property value of the product by the reactor derived from the AI control model unit 100 is further improved.

According to an exemplary embodiment of the present invention, the AI control model unit 100 may be trained by one or more of linear regression, logistic regression, a decision tree, a random forest, a support vector machine, gradient boosting, a convolution neural network, a recurrent neural network, long-short term memory, an attention model, a transformer, a generative adversarial network, reinforcement learning, or combinations (ensemble) thereof.

The input unit 200 may obtain data including the process operation condition including the input condition of the reactor, the operation condition of the reactor, and the physical property value of the product, the target operation condition of the reactor, and the target physical property value of the product by the reactor, and provide the obtained data to the AI control model unit 100. According to an example, the data may include all process data of the reactor to be controlled, including the contents described above. According to an example, the data may be collected in real time from the reactor in a plant. According to an example, the target operation condition of the reactor and the target physical property value of the product by the reactor obtained from the input unit 200 may be set in advance by an external user (a manager, etc.).

The output unit 300 may be provided with the optimal input condition of the reactor to satisfy the target operation condition of the reactor and the target physical property value of the product by the reactor from the AI control model unit 100, and may control input of the reactor under the optimal input condition of the reactor.

According to an exemplary embodiment of the present invention, a reactor including the AI-based process control system described above may be provided.

The reactor may be one of a tubular reactor, a tower reactor, a stirred tank reactor, a fluidized-bed type reactor, and a loop reactor.

According to an exemplary embodiment of the present invention, the reactor may be provided in plurality, and the plurality of reactors may be the same or different from each other and may be one of a tubular reactor, a tower reactor, a stirred tank reactor, a fluidized-bed type reactor, and a loop reactor, independently. When a plurality of reactors are configured, a connection method therebetween is not particularly limited. For example, the plurality of reactors may be connected in parallel, but is not limited thereto.

According to an exemplary embodiment of the present invention, the present invention may easily derive an optimal reactor input condition for achieving the target operation condition of the reactor and the target physical property value of the product by using the AI model.

According to an exemplary embodiment of the present invention, since the input of the reactor may be controlled with the optimal reactor input condition, unit costs and time required for production of products may be reduced.

According to an exemplary embodiment of the present invention, by controlling the process using an AI model, the intervention of an external user (a manager, etc.) may be minimized, thereby reducing trial and error and obtaining a highly reliable reactor product.

The AI-based process control system of the present invention may be applied to various petrochemical processes, oil refining processes, chemical processes, etc., specifically, to a polymer process, more specifically, a polyolefin process using an olefin monomer having C2 to C12 carbon atoms, more specifically, to a polyethylene process using a solution polymerization method (solution process), so there is industrial applicability.

In the above, exemplary embodiments of the present invention have been described, but the present invention is not limited thereto and it will be appreciated that the present invention may be variously changed and modified by those skilled art within the scope that does not deviate from the concept and scope of the claims described below.

The invention claimed is:

1. An artificial intelligence (AI) model-based process control system comprising:

an AI control model unit including a data storage unit storing a plurality of pieces of preset reactor process data, a data correction unit generating training data by removing outliers from the stored reactor process data, and a data derivation unit for deriving, using an AI model trained using the generated training data, an optimal reactor input condition for satisfying a reactor operation condition and a physical property value of a product produced by a reactor;

an input unit obtaining data including a reactor target operation condition and a target physical property value of the product and providing the obtained data to the AI control model unit; and an output unit receiving the optimal reactor input condition for satisfying the reactor target operation condition and the target physical property value of the product from the AI control model unit and controlling input of the reactor based on the optimal reactor input condition, wherein the data derivation unit derives the optimal reactor input condition based on the reactor target operation condition and the target physical property value of the product provided by the input unit, and derives a predicted operation condition of the reactor and a predicted physical property value of the product produced by the reactor based on the optimal reactor input condition, wherein the AI control model unit further includes:

a data analysis unit comparing the predicted operation condition of the reactor and the predicted physical property value of the product by the reactor derived by the data derivation unit with an actual operation condition of the reactor and an actual physical property value of the product by the reactor included in the training data; and a data retraining unit retraining the AI model when a comparison result provided from the data analysis unit satisfies with condition (1) or condition (2) below:

(1) when an error rate between the actual operation condition of the reactor and the predicted operation condition of the reactor exceeds a preset tolerance, (2) when the error rate between the actual physical property value of the product and the predicted physical property value of the product exceeds a preset tolerance, wherein the optimal reactor input condition includes (a) below:

(a): one or more of a composition, temperature, flow rate, and pressure of a raw material introduced into the reactor or combinations thereof.

2. The AI model-based process control system of claim 1, wherein the optimal reactor input condition further includes (b) below:

(b) a composition, temperature, flow rate, and pressure of a catalyst introduced into the reactor or combinations thereof.

3. The AI model-based process control system of claim 1, wherein the plurality of pieces of preset reactor process data includes actual reactor process data or reactor process data derived by simulation, wherein the actual reactor process data includes an actual input condition of the reactor, an actual operation condition of the reactor, and an actual physical property value of the product by the reactor, and wherein the reactor process data derived by simulation includes an input condition of the reactor derived by simulation, an operation condition of the reactor derived by simulation, and a physical property value of the product by the reactor derived by simulation.

4. The AI model-based process control system of claim 1, wherein, when the target physical property value provided from the input unit is changed during an operation of the reactor, the data derivation unit derives a new optimal input condition of the reactor by analyzing dynamic characteristics of the optimal reactor input condition for reaching a changed target physical property value from a time point at which the target physical property value is changed.

5. The AI model-based process control system of claim 1, wherein the AI control model unit is trained by one or more of linear regression, logistic regression, a decision tree, a random forest, a support vector machine, gradient boosting, a convolution neural network, a recurrent neural network, long-short term memory, an attention model, a transformer, a generative adversarial network, reinforcement learning, or combinations (ensemble) thereof.

6. A reactor including an artificial intelligence (AI) model-based process control system, the artificial intelligence (AI) model-based process control system comprising:

an AI control model unit including a data storage unit storing a plurality of pieces of preset reactor process data, a data correction unit generating training data by removing outliers from the stored reactor process data, and a data derivation unit deriving, using an AI model trained using the generated training data, an optimal reactor input condition for satisfying a reactor operation condition and a physical property value of a product of the reactor;

an input unit obtaining data including a reactor target operation condition and a target physical property value of the product and providing the obtained data to the AI control model unit; and an output unit receiving the optimal reactor input condition for satisfying the reactor target operation condition and the target physical property value of the product from the AI control model unit and controlling input of the reactor under the optimal reactor input condition, wherein the optimal reactor input condition includes (a) below:

(a): one or more of a composition, temperature, flow rate, and pressure of a raw material introduced into the reactor or combinations thereof;

wherein the data derivation unit derives the optimal reactor input condition based on the reactor target operation condition and the target physical property value of the product provided by the input unit, and derives a predicted operation condition of the reactor and a predicted physical property value of the product produced by the reactor based on the optimal reactor input condition, wherein the AI control model unit further includes:

a data analysis unit comparing the predicted operation condition of the reactor and the predicted physical property value of the product by the reactor derived by the data derivation unit with an actual operation condition of the reactor and an actual physical property value of the product by the reactor included in the training data; and a data retraining unit retraining the AI model when a comparison result provided from the data analysis unit satisfies with condition (1) or condition (2) below:

(1) when an error rate between the actual operation condition of the reactor and the predicted operation condition of the reactor exceeds a preset tolerance, (2) when the error rate between the actual physical property value of the product and the predicted physical property value of the product exceeds a preset tolerance.

7. The reactor of claim 6, wherein the reactor is one of a tubular reactor, a tower reactor, a stirred tank reactor, a fluidized-bed type reactor, and a loop reactor.

8. The reactor of claim 6, wherein the reactor is provided in plurality, and the plurality of reactors is one of a tubular reactor, a tower reactor, a stirred tank reactor, a fluidized-bed type reactor, and a loop reactor, independently.

* * * * *